Oct. 9, 1934.  C. W. LIGHTHALL  1,976,030
SPRINKLER
Filed Oct. 12, 1932   2 Sheets-Sheet 1

INVENTOR.
CONE W. LIGHTHALL
BY
Barnes Kisselle & Laughlin
ATTORNEYS

Oct. 9, 1934.  C. W. LIGHTHALL  1,976,030
SPRINKLER
Filed Oct. 12, 1932  2 Sheets-Sheet 2
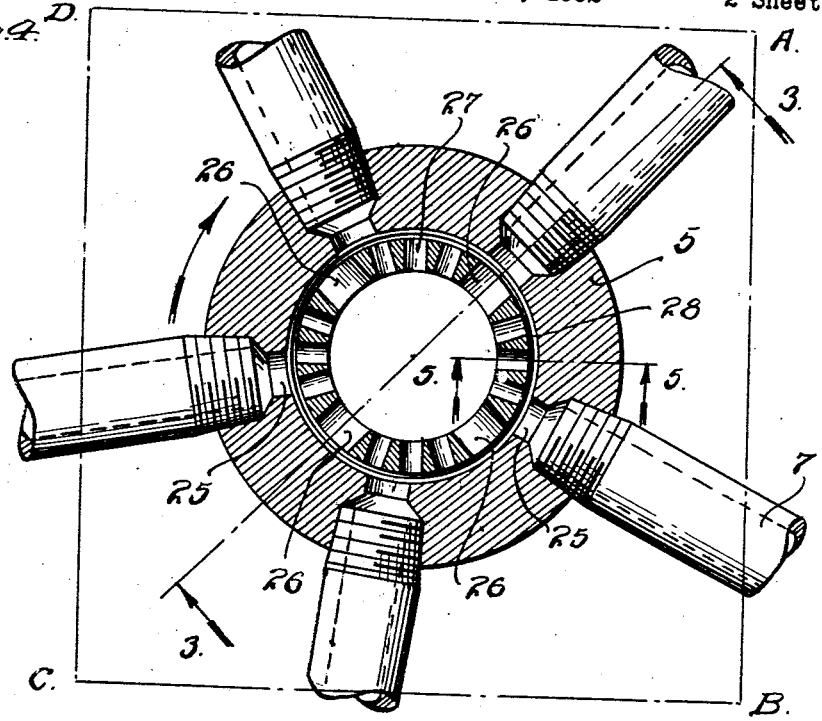
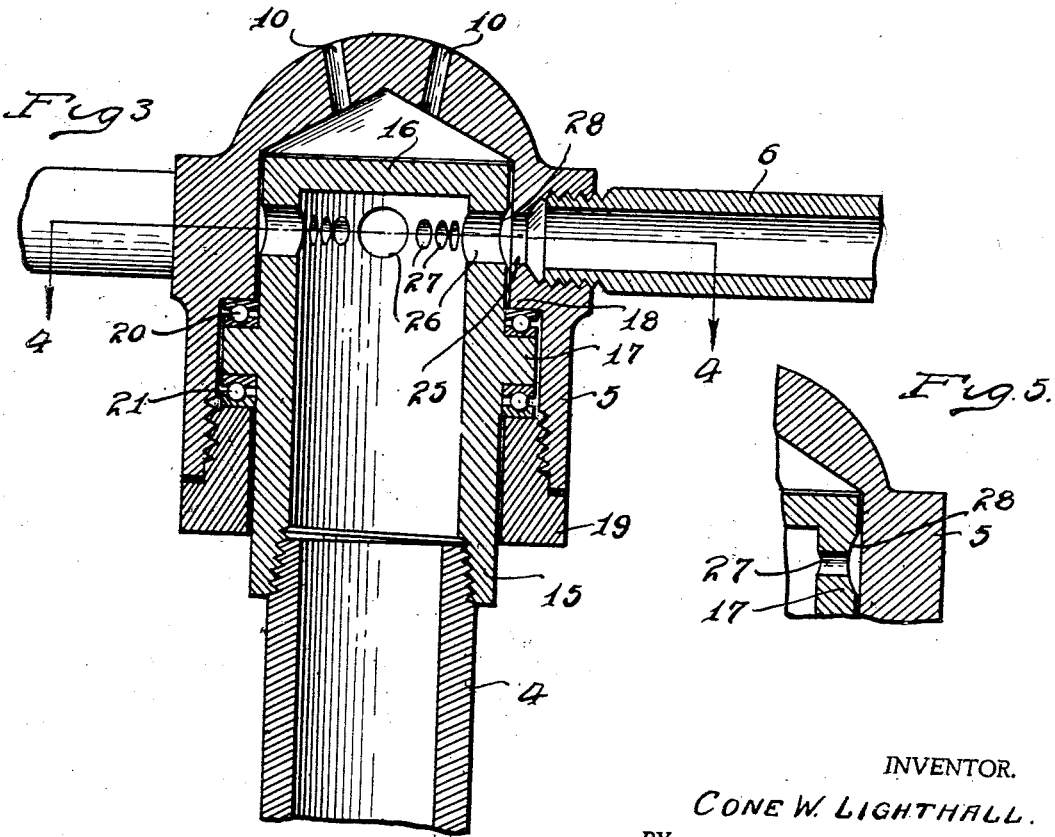
INVENTOR.
CONE W. LIGHTHALL.
BY
Barnes Kisselle & Laughlin
ATTORNEYS.

Patented Oct. 9, 1934

1,976,030

UNITED STATES PATENT OFFICE 1,976,030

SPRINKLER

Gone W. Lighthall, Ann Arbor, Mich., assignor to Hoover Steel Ball Company, Ann Arbor, Mich., a corporation of Michigan Application October 12, 1932, Serial No. 637,483

4 Claims. (Cl. 299—19)

This invention relates to sprinklers and has to do particularly with a sprinkler of rotary type adapted for sprinkling or irrigating lawns, gardens, flower beds, roadways, or other plots of ground or surfaces.

The object of the invention is to provide a rotary type sprinkler which will sprinkle a substantially polygonal area. The advantages of such a sprinkler will be readily appreciated in connection with watering lawns; for example, the sprinkler may be so set to water up to the edge of a building, a driveway, or walk, or up to a property line. Furthermore, such a sprinkler, or a plurality of them in use at once, may insure that all parts of a lawn or the like to be watered, are covered, yet it eliminates substantial overlapping as is the case with the ordinary sprinkler which covers an area roughly circular in form. These advantages apply particularly where the sprinkler is arranged to cover a square area.

In the drawings:

Fig. 2 is a side elevation thereof with the standpipe cut through.

Fig. 3 is a vertical cross-sectional view taken through the head of the sprinkler and substantially on line 3—3 of Fig. 4.

Fig. 4 is a horizontal sectional view taken on line 4—4 of Fig. 3.

Fig. 5 is a sectional detail taken on the line 5—5 of Fig. 4.

Figure 1:
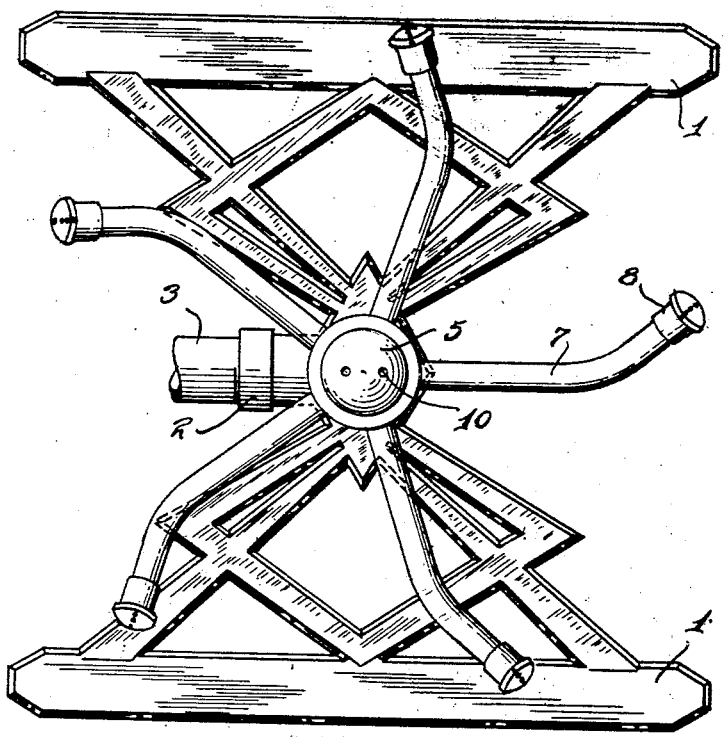
Fig. 1 is a top plan view of a sprinkler which may be constructed in accordance with the invention.
Figure 2:
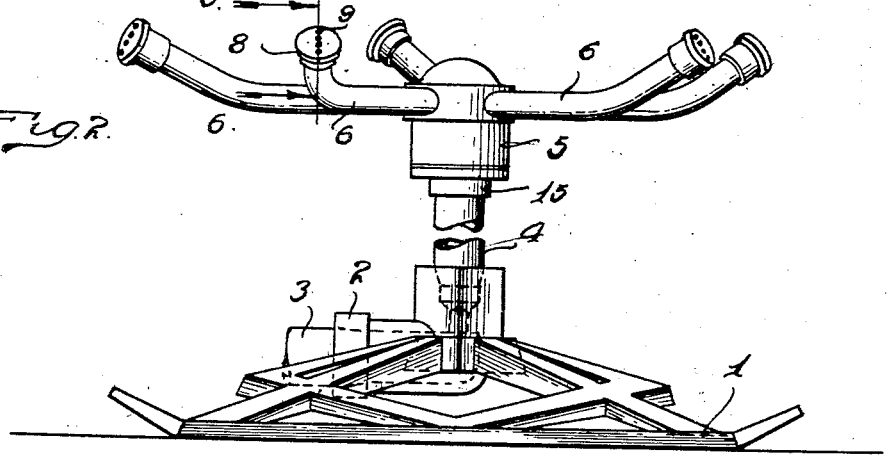
Figure 6:
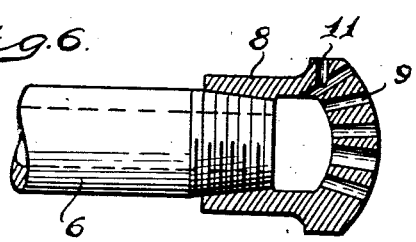
Fig. 6 is a view illustrating a spray head in cross section.

The sprinkler may comprise a suitable base 1 which advantageously is of fairly good size and generally square in overall dimensions so that it can be set advisedly by an operator to thus determine the position of an area which is to be sprinkled. This is particularly the case where a square area is to be sprinkled. A suitable inlet coupling is provided at 2 for the reception of a conduit or hose 3. Rising from the base is a standpipe 4. A rotary head 5 may be positioned on the standpipe and the same may carry spray arms 6 in the form of tubes or pipes screw-threaded into the head 5 as shown in Fig. 3, and these arms may be bent as shown at 7 in order to effect a reactive force for rotating the head in the well-known manner. Spray heads 8 having outlet openings 9 may be in the form of caps screw-threaded onto the ends of the spray arms 6 as shown in Fig. 6. The head 5 may have apertures at 10, as shown in Fig. 3, and each spray head may have an aperture 11. These apertures 10 and 11 are for the purpose of spraying water in close proximity to the location of the sprinkler.

In conjunction with the rotary head 5 there is what may be termed a distributor head. This is shown at 15 and it may be a hollow fixture screw-threaded onto the end of the standpipe 4. Its upper end may be closed as shown at 16. Accordingly, it will be noted that the distributor head 15 is stationary as regards the standpipe and base, and it may support the rotary head. For this purpose it may have an annular flange 17 confined between an internal shoulder 18 in the rotary head and a bushing 19 screw-threaded into the rotary head. If desirable, anti-friction bearings 20 and 21 may be employed. Accordingly, it will be appreciated that the rotary head is freely rotatable relatively to the standpipe and the distributor head.

The rotary head and distributor head have ports or passageways which are so disposed to successively register with each other and with different portions of each other, and the ports are so arranged that the effective orifice or passageway into a given spray arm varies. It will be noted by reference to Fig. 4 that the head 5 has ports 25, one for each spray arm. The distributor head has ports of different cross sectional areas and are arranged in accordance with the shape of the polygonal area to be sprinkled. If the area to be sprinkled is to be square, then the distributor head may have four relatively large ports 26 extending through the walls thereof, and between the large ports it may have a series of smaller ports 27. As shown, there are three small ports between the large ports. A circumferential groove may be provided in the distributor head as illustrated in Fig. 3, the groove being indicated at 28 and the center line of the groove advantageously coincides with the centers of the ports.

In the operation of the device, the water flows up through the standpipe and into the distributor head, through the ports therein and into the spray arms which set up rotary movement of the rotary head carrying the spray arms. A given spray arm, in making the revolution successively registers with the four large ports 26 as well also with the small ports located between the large ports, and at the same time is in constant register with the groove 28. As above pointed out where the area to be sprinkled is square, the distributor head may be provided with four large ports.

Referring to Fig. 4, it will be observed that a square area is illustrated which obviously is much reduced in scale but it will serve for the purpose of illustration. The spray arm which is directed towards the corner A is in direct registry with one of the large ports 26. Thus the effective orifice is relatively great and an increased volume of water is allowed to move into this arm. The spray heads 8, however, are of constant size. The result is that the stream of water forced therefrom will be shot out to relatively great distance and to the corner A. The rotary head, it will be assumed, moves in a clockwise direction as Fig. 4 is viewed. As the spray arm moves from corner A to corner B the volume of water is reduced although it is substantially continuous since the port 25 of this spray arm is in constant registry with the groove 28, and comes into successive registration with the three small ports. The flow of water may be supplemented by some overflow from the large ports 26, while the arm is between two longer ports. The spray arm approaching corner B is just coming into registry with a large port. The spray arm directed between C and B is in registry with portions of small ports. The same is true of the spray arm between C and D. The spray arm between D and A is just leaving the corner D and is accordingly just moving out of registry with a port 26.

Normally the area to be sprinkled is square as this is probably the most advantageous form for most purposes. However, other polygonal shapes may be sprinkled by varying the number of large ports. When the device is assembled it is advantageous that the ports 26 be lined up with the corners of the square base so that the base will serve as an indicator. A further item of importance is that it is preferable to have the spray arms so arranged that they all do not register with the large ports simultaneously, as this would cut down the effectiveness of the long spray for the corners. Where an even number of large ports are employed in the distributor head, an odd number of spray arms may be used. For example, if four spray arms were used equally spaced 90° apart, they would all register with large ports simultaneously, and this would cut down the effective pressure in individual arms. Accordingly, it will be appreciated that a square area may be sprinkled by the use of an odd number of spray arms; five arms are shown in the drawings but other numbers of spray arms may be used, as for example, three arms or one spray arm. Two spray arms or four spray arms could be used, in which case it would be preferable that the two were not placed diametrically opposite, and the four not equally spaced 90° apart. But this, in case of two arms, would probably throw the rotary head out of balance. However the claims appended hereto are intended to cover any such variations in the number of spray arms. The ports 10 and 11 throw sprays of water for sprinkling the area immediately surrounding the sprinkler.

In order to give more definite information on the subject the specific dimensions of a sprinkler which has been constructed and satisfactorily operated may be noted. This specific information, however, is given as an example only and it will be appreciated that the invention is not limited thereto. In this sprinkler the inlet 2 was a standard one-half inch coupling; the standpipe 4 was a three-eighth inch pipe; the spray arms were one-eighth inch pipes; the large apertures 26 were about .213 of an inch in diameter; the small ports 11 were about .081 of an inch in diameter; the groove 28 had a depth of about .038 of an inch cut on a 7/64 of an inch radius. The ports 25 were of the same size as the ports 26. Obviously, larger sizes or smaller sizes may be employed, and it is emphasized again that the above specific example is in no way to be considered as limiting the invention.

The invention may be employed in a sprinkler having structural features materially different than the sprinkler shown, particularly as regards the base structure and stand pipe arrangement. The essence of the invention resides in the manner in which the fluid is distributed Accordingly the distributing head and rotary head may be used in a multiple sprinkling system where the pipes are under ground; also with an overhead system where the pipes are supported above the level of the ground. In these cases the distributor head may be attached directly to a pipe, to the elimination of the stand pipe and base. While the invention is particularly useful in sprinkling water, the invention covers sprinkling any fluid. One place where the invention may be advantageously used is in connection with concrete highways, or the like, which are sprinkled while the concrete is setting.

It is appreciated that rotary sprinkler structures for covering a rectangular area have been heretofore proposed. However, it may be said that before arriving at the structure of the present invention a large number of experiments were made with sprinklers of various structural arrangements. It has been found that some structural arrangements will cover a rectangular area with a given pressure of water which remains constant and at a given speed of rotation, but such structures are not capable of covering a rectangular area where the pressure and/or speed of rotation vary. In other words, where some structures will provide a square sprinkling arrangement under given conditions, the area will not remain square upon increase or decrease of pressure, or increase or decrease of speed of rotation. A sprinkler designed in accordance with the one described herein has been found to be capable of covering a rectangular area which is substantially a perfect square, and that the square arrangement will be maintained regardless of pressure and regardless of the speed of rotation. In other words, the pressure may increase or decrease, and the speed of rotation may increase or decrease yet the sprinkler covers a square area at all times although, of course, the size of the area may vary with the variation of other factors.

I claim:

1. A rotary sprinkler for sprinkling a polygonal area, comprising a rotary spray head having ports therein, spray arms connecting with the ports and extending outwardly from the head, a hollow distributor head closed at one end and open at the other for the flow of fluid thereinto, said distributor head having a series of circumferentially arranged ports through its wall in substantial alignment with the ports in the rotary head, the number of ports being in excess of the number of sides to the area to be sprinkled, some of said ports in the distributor head being relatively large in cross section and the number of said large ports corresponding to the number of sides to the area to be sprinkled, and the other of said ports being relatively small in cross section, said rotary head and distributor head being relatively rotatable whereby the ports in the rotary head are adapted to register successively with the ports in the distributor head and a groove in one of the said heads in registration with the ports in the other head.

2. A rotary sprinkler for sprinkling a polygonal area with a fluid, comprising a hollow sprinkler head having ports through its walls, spray arms one connected to each port and projecting substantially radially from the spray head, said spray arms being bent whereby to rotate the spray head by reactive force, means on the end of each spray arm providing fluid outlets of constant size, a non-rotatable hollow distributor head fitting within the spray head, closed at one end and open at the other for the flow of fluid thereinto, said spray head having a series of circumferentially arranged circular ports through its wall, some of said ports being relatively large and corresponding in number to the number of sides of the polygonal area and the other of said ports being relatively small with which the ports in the rotary spray head come into successive registration, the total number of said ports being in excess of the number of sides of the area to be sprinkled, and said distributor head having a circumferential groove in its outer wall cutting through and in alignment with a circumferential series of ports therein and in alignment with the ports in the spray head, whereby the ports in the spray head are in constant registration with said groove.

3. A rotary sprinkler for sprinkling a square area, comprising a rotary sprinkler head having an odd number of ports with a spray arm connected to each port, a fixed distributor head into which fluid flows having a series of circumferentially arranged ports extending through its wall in alignment with the ports in the rotary spray head, four of said ports being relatively large in cross sectional area and located 90° apart, others of said ports having a relatively small cross sectional area and a plurality of said small ports being located between each two of the relatively large ports and all arranged to be traversed by the ports in the sprinkler head and a channel with which all ports in the distributor head communicate.

4. A rotary sprinkler for sprinkling a square area, comprising a rotary sprinkler head having an odd number of ports with a spray arm connected to each port, a fixed distributor head into which fluid flows having a series of circumferentially arranged ports extending through its wall in alignment with the ports in the rotary spray head and serving as the only outlet for fluid from the distributor head, four of said ports being relatively large in cross sectional area and located 90° apart, others of said ports having a relatively small cross sectional area and located between the relatively large ports, and one of said heads having a circumferential groove in alignment with the ports in both heads.

CONE W. LIGHTHALL.